(12) United States Patent
Chi et al.

(10) Patent No.: US 9,020,571 B2
(45) Date of Patent: Apr. 28, 2015

(54) MOBILE TERMINAL

(71) Applicant: LG Electronics Inc., Seoul (KR)

(72) Inventors: Jumin Chi, Seoul (KR); Seongki Sohn, Seoul (KR); Namki Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 13/693,660

(22) Filed: Dec. 4, 2012

(65) Prior Publication Data

US 2014/0004906 A1 Jan. 2, 2014

(30) Foreign Application Priority Data

Jun. 29, 2012 (KR) .......................... 10-2012-0070883

(51) Int. Cl.
| | |
|---|---|
| *H04M 1/00* | (2006.01) |
| *G06F 1/16* | (2006.01) |
| *G06F 3/01* | (2006.01) |
| *G06F 3/0488* | (2013.01) |
| *G06F 1/26* | (2006.01) |
| *H04M 1/02* | (2006.01) |
| *H04B 1/38* | (2006.01) |
| *H04M 1/725* | (2006.01) |
| *H04M 19/04* | (2006.01) |

(52) U.S. Cl.
CPC ............... *H04B 1/38* (2013.01); *G06F 1/1652* (2013.01); *G06F 3/016* (2013.01); *G06F 3/0488* (2013.01); *G06F 1/1626* (2013.01); *G06F 1/1635* (2013.01); *G06F 1/1637* (2013.01); *G06F 1/1643* (2013.01); *G06F 1/1656* (2013.01); *G06F 1/1658* (2013.01); *G06F 1/166* (2013.01); *G06F 1/1694* (2013.01); *G06F 1/263* (2013.01); *G06F 3/017* (2013.01); *G06F 2200/1636* (2013.01); *H04M 1/0268* (2013.01); *H04M 1/72597* (2013.01); *H04M 19/04* (2013.01); *H04M 2250/12* (2013.01)

(58) Field of Classification Search
CPC ........................... G06F 1/1652; H04M 1/0268
USPC ............... 455/550.1, 566, 575.1, 575.3, 90.1, 455/90.2, 90.3
See application file for complete search history.

(56) References Cited

U.S. PATENT DOCUMENTS

| | | | |
|---|---|---|---|
| 8,380,327 B2 * | 2/2013 | Park | .................................. 700/1 |
| 2003/0109286 A1 | 6/2003 | Hack et al. | |
| 2010/0056223 A1 | 3/2010 | Choi et al. | |
| 2012/0050075 A1 | 3/2012 | Salmon | |

FOREIGN PATENT DOCUMENTS

| | | |
|---|---|---|
| EP | 2 192 750 A2 | 6/2010 |
| EP | 2 285 077 A2 | 2/2011 |
| EP | 2 315 186 A2 | 4/2011 |
| WO | WO 2007/148967 A2 | 12/2007 |

* cited by examiner

*Primary Examiner* — Eugene Yun
(74) *Attorney, Agent, or Firm* — Birch, Stewart, Kolasch & Birch, LLP

(57) ABSTRACT

A mobile terminal is provided. The mobile terminal includes a body having at least one predetermined flexible portion, a display provided in the body to output image information, an actuator provided in the body to transform a shape of the body from an original shape to a transformed shape and a controller configured to control the actuator to transform the shape of the body when a preset condition is satisfied.

19 Claims, 26 Drawing Sheets

(a)

(b)

(a)

(b)

MOBILE TERMINAL

Pursuant to 35 U.S.C. §119(a), this application claims the benefit of earlier filing date and right of priority to Korean Application No. 10-2012-0070883, filed on Jun. 29, 2012, the contents of which are hereby incorporated by reference herein in their entirety.

BACKGROUND OF THE DISCLOSURE

1. Field of the Disclosure

The present invention relates to a mobile terminal which can automatically change a shape thereof when a preset condition is satisfied to enhance user convenience.

2. Discussion of the Related Art

A mobile terminal is a device which may be configured to perform various functions such as data and voice communication, inputting and outputting information, data transmission and data storing.

The mobile terminal may be configured to perform complex functions such as capturing images and video, playing music, video files and games, receiving broadcasted programs and providing wireless internet. Often such a mobile terminal may be a multimedia player.

In addition, there are ongoing attempt to apply a double-faced Liquid Crystal Display (LCD), a flexible display, a touch screen and the like to the mobile terminal.

SUMMARY OF THE DISCLOSURE

Accordingly, the present invention is directed to a mobile terminal. An object of the present invention is to provide a mobile terminal which can automatically change a shape thereof when a preset condition is satisfied to enhance user convenience.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a mobile terminal a body having at least one predetermined flexible portion, a display provided in the body to output image information, an actuator provided in the body to transform a shape of the body from an original shape to a transformed shape and a controller configured to control the actuator to transform the shape of the body when a preset condition is satisfied.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DESCRIPTION OF SPECIFIC EMBODIMENTS

In the following detailed description, reference is made to the accompanying figures which form a part hereof, and which show by way of illustration exemplary embodiments of the invention.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to various types of mobile terminals. Examples of such terminals include mobile phones, user equipments, smart phones, digital broadcast receivers, personal digital assistants, laptop computers, portable multimedia players (PMP), navigators and the like.

Figure 1:
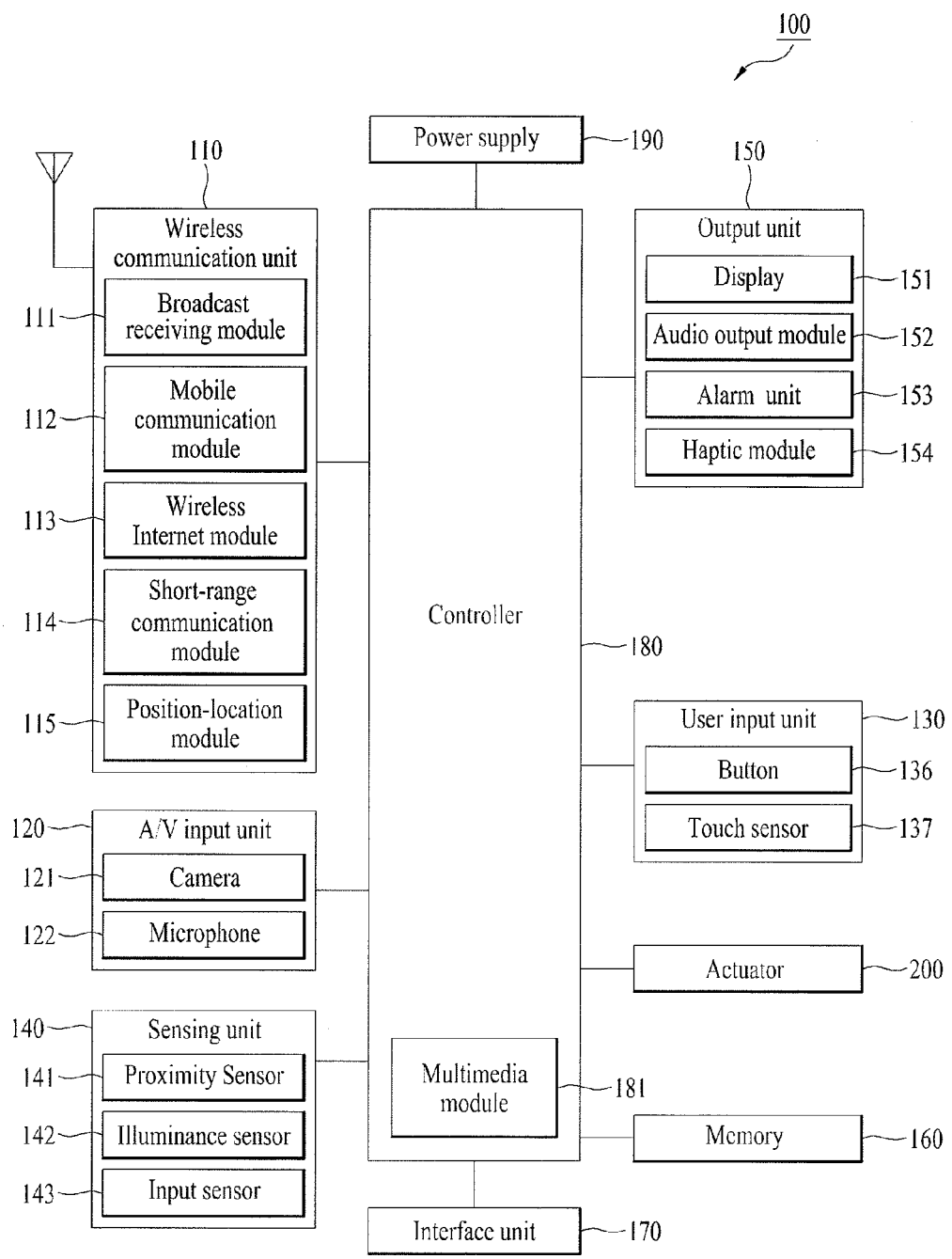
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190, an actuator 200 and the like. FIG. 1 shows the mobile terminal 100 having various components, but it is understood that implementing all of the illustrated components is not a requirement. Greater or fewer components may alternatively be implemented.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which includes a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. Also, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H). The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message that are transmitted/received, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 is a module configured to locate the position of the terminal 100 such as Global Position System (GPS) and it receives position information from a plurality of satellites.

A/V (audio/video) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 during a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

Meanwhile, the sensing unit 140 may include a proxy sensor 141 for sensing proximity of the user to the mobile terminal, an acceleration sensor 142 for measuring an accelerating applied to the mobile terminal 100 and a pressure sensor 143 for sensing the pressure of the force possessed by the user to hold the mobile terminal 100.

The output unit 150 generates outputs relevant to the senses of sight, hearing, touch and the like. In addition, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

The display 151 of the present invention is configured to be flexible and transparent plastic is used in providing the display 151 instead of a glass substrate. With the display 151 formed in this manner, the flexible display can be folded or rolled up freely. Such a flexible display is configured to have flexibility that enables the display to be folded or unfolded.

One or more of such flexible displays may be configured to be a transparent type or light-transmissive type. Such a display may be referenced to as a transparent display. Examples of transparent displays include a transparent OLED (TOLED) and the like. A rear structure of the display 151 may be configured of a light-transmissive type structure and such a light-transmissive structure enables the user to see objects located in rear of the terminal body via a predetermined region occupied by the display 151 of the terminal body.

Some of the above displays can be implemented in a transparent or optical transmittive type, which can be referred to as a transparent display. As a representative example of the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

The touch sensor 137 can be configured to convert a pressure applied to a specific portion of the display 151 or a variation of a capacitance generated from a specific portion of the display 151 to an electric input signal. Moreover, the touch sensor 137 can be configured to detect a pressure of a touch as well as a touched position or size. If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 2:
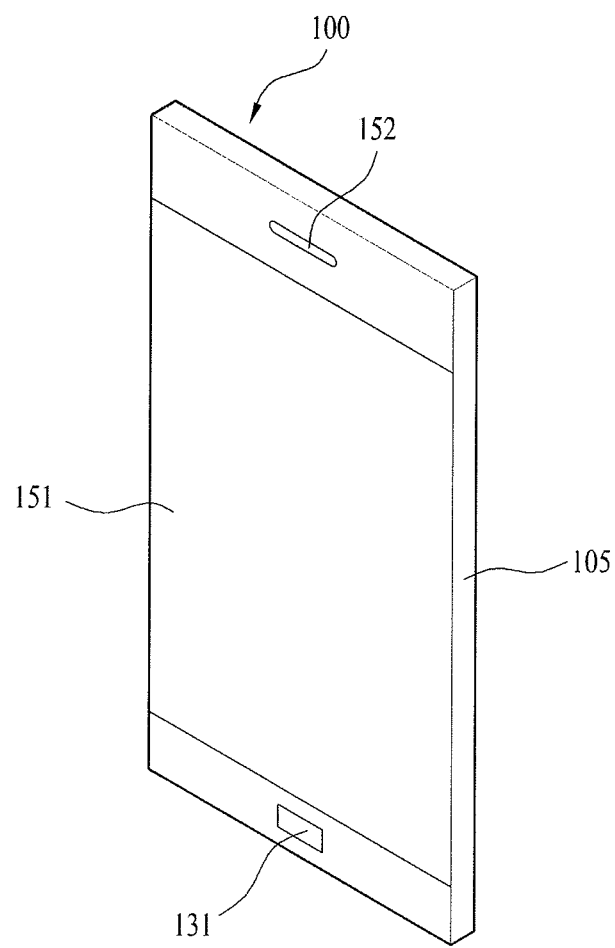
FIG. 2 is a front perspective view of the mobile terminal according to one embodiment of the present invention.

Referring to FIG. 2, while not shown, the proximity sensor 141 may be arranged in an inner region of the mobile terminal covered by the touch screen or near the touch screen. The touch controller processes the signal(s) and then transfers the processed signal(s) to the controller 180. Therefore, the controller 180 can know whether a prescribed portion of the display 151 is touched. Alternatively, the proximity sensor 141 can be provided to an internal area of the mobile terminal 100 enclosed by the touchscreen or around the touchscreen.

The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. In the memory unit 160 may be stored usage frequency for the data (for example, the usage frequency of phone numbers, messages and multimedia).

Moreover, data for various patterns of vibration and/or sound output in response to a touch input to the touchscreen can be stored in the memory unit 160.

The memory unit 160 may include one or more storage media such as a predetermined type may be a flash memory type, a hard disk type, a multimedia card micro type, a card type memory (for example, SD or XD memory), RAM (Random Access Memory), SRAM (Static Random Access Memory), 돔 (Read-Only Memory, ROM), EEPROM (Electrically Erasable Programmable Read-Only Memory), PROM (Programmable Read-Only Memory), magnetic memory, magnetic disk and optical disk. The mobile terminal 100 may be operated in association with a web storage that implements a storage function of the memory unit 160 on the internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 is typically configured to control an overall operation of the mobile terminal. For example, the controller 180 implements control and process associated with voice communication, data communication, and video communication. The controller 180 may include a multimedia module 181 for multimedia playing. Such a multimedia module 181 may be realized in the controller 180 or realized separately from the controller 180.

The controller 180 may perform a process of recognizing a pattern of writing input or drawing input as characters and images.

The controller 180 may control the actuator 200 to transform the shape of the body when a preset condition is satisfied. There are many types of preset conditions, for example an emergency situation, an occurring notification or an event following another event.

When the preset condition is satisfied the controller 180 controls the actuator 200 or the display to prevent damage to the mobile terminal and offering convenience to the user.

The power supply unit 190 is configured to supply the power required to operate the components by receiving an external power and an internal power based on the control of the controller 180. For example, the power supply unit 190 may include a battery, a connection port, a power supply controller and a charging-monitor.

A battery may include a built-in rechargeable battery and may be detachably attached to the terminal body for a charging and the like. A connecting port may be configured as one example of the interface 170 via which an external charger for supplying a power of a battery charging is electrically connected.

The actuator 200 is configured to control the mobile terminal to move actively. The mobile terminal may be bent or transformed by the actuator 200. The body 105 of the mobile terminal 100 is formed of a flexible material to allow the shape of the mobile terminal to be transformed by the operation of the actuator 200. A shape-memory alloy 210 or a motor 220 may be used as the actuator 200, of which detailed description will be provided later.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective view illustrating a mobile terminal according to one embodiment of the present invention. In FIG. 2 are shown a mobile terminal body 105, a display 151, an audio output unit 152 and a camera 121.

The mobile terminal body 105 has a predetermined flexible portion. Optionally, an entire portion of the mobile terminal body 105 may be formed of a flexible material or a predetermined portion thereof may be formed of a flexible material.

To provide a flexible body, a ductile plastic material may be used instead of the conventional metal or glass material or a folding structure may be provided to a predetermined portion of the body. The portion having such a folding structure can be bendable.

The display 151 occupies a large portion of the mobile terminal body 105 and it implements an image or video outputting function. Recently, a touch sensor has been provided in the display 151 and a touchscreen capable of outputting and inputting simultaneously has been formed. Especially, with a recent tendency requiring a large-scaled screen, a user input unit 130 and 131 is minimized and a touchscreen is used to replace most of the input functions.

The display 151 according to an embodiment of the present invention may be a flexible display that is transformable corresponding to the transformation of the flexible body 105. Such a flexible display uses a plastic material, not the conventional glass substrate.

An audio output unit 152, a user input unit 131, a camera and the like may be arranged in the mobile terminal body 105.

Although not shown in FIG. 2, the actuator 200 is provided in the mobile terminal according to an embodiment of the present invention. The actuator 200 is a device that provides a force used in bending the flexible body 105 and it is arranged in a flexible position of the body 105.

The flexible body 105 is not moved by the actuator 200 in response to user selection, but is actively controlled by the controller 180 to be folded or bent. The bending position may be variable based on the arrangement of the actuator 200 or the flexible position of the body 105.

Figure 3:
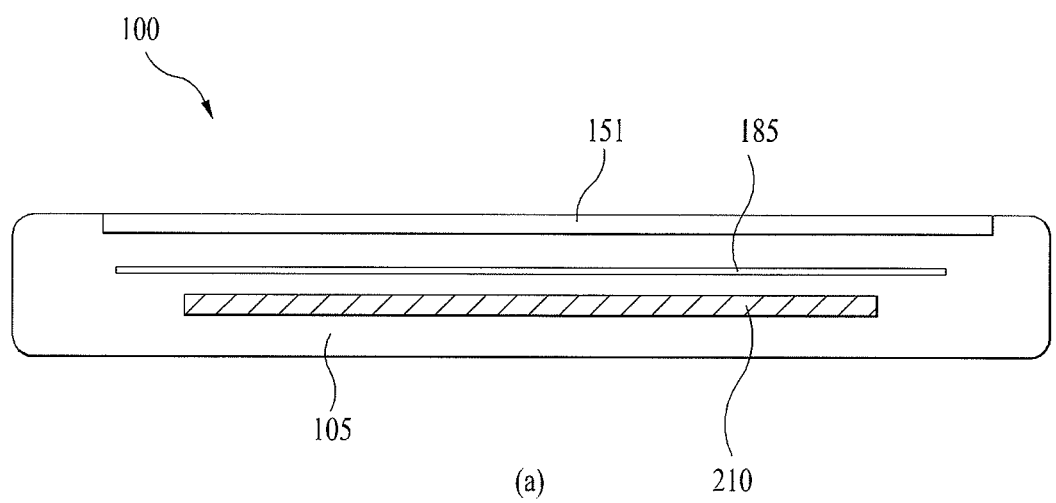
FIGS. 3 to 5 are diagrams to explain an actuator according to an embodiment of the present invention.
Figure 3:
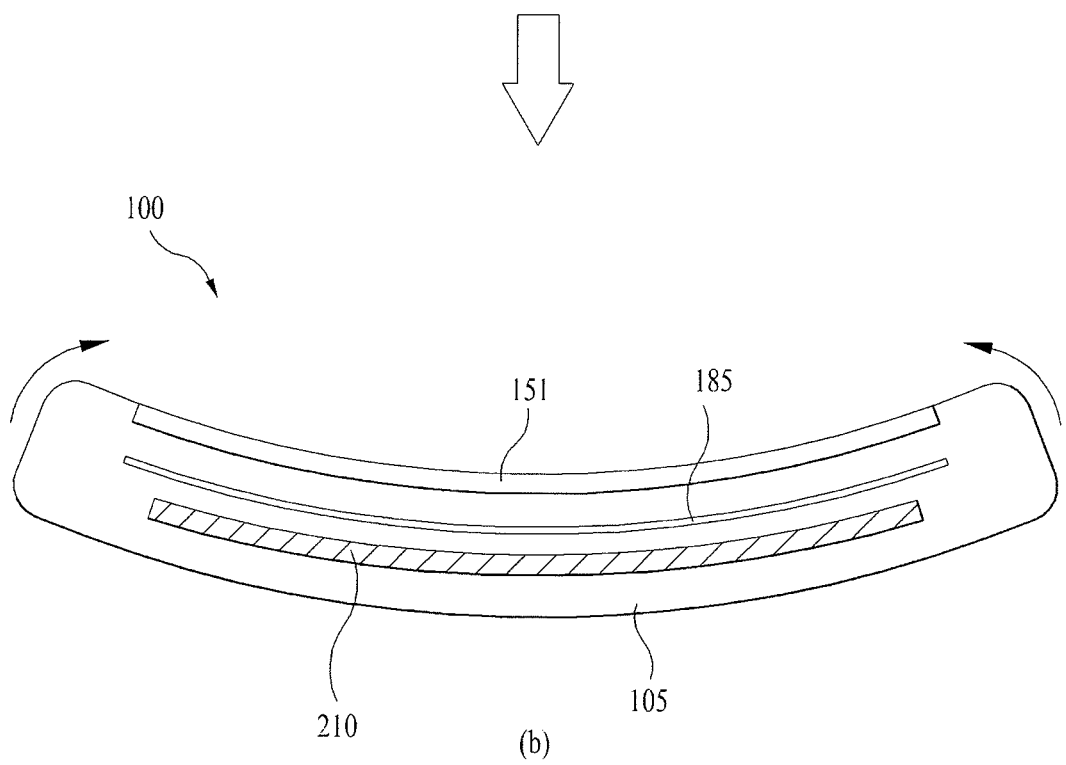
Figure 5:
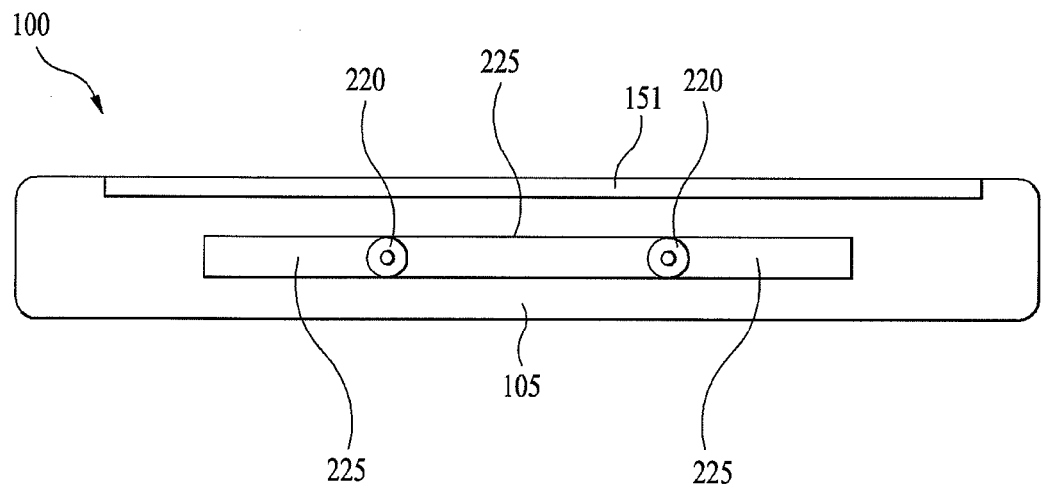
Figure 5:
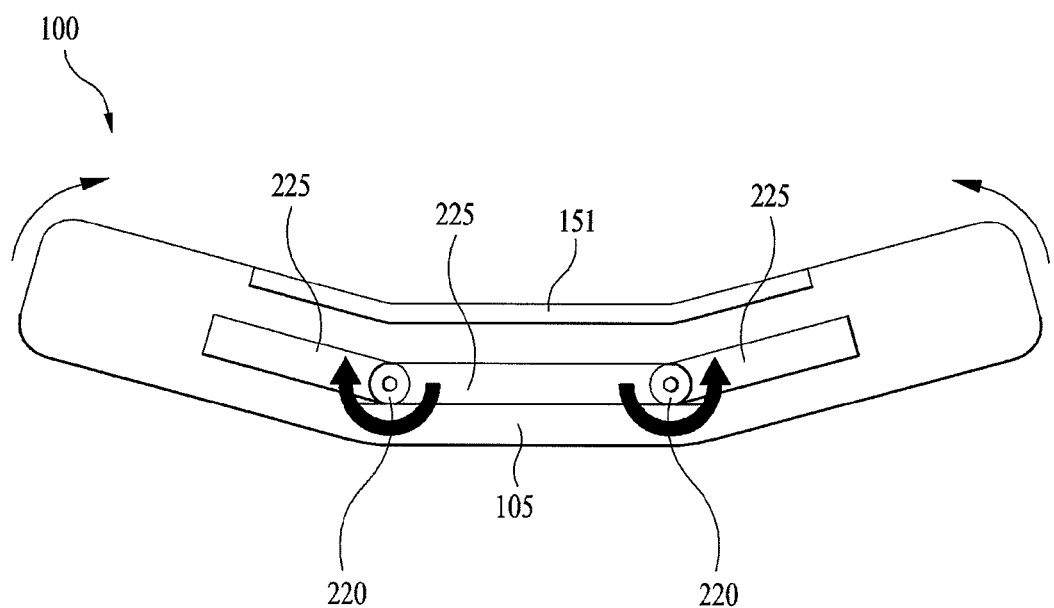

For ease explanation, the entire portion of the body 105 is formed of the flexible material as shown in FIG. 3; however, it is understood that only part of the body 105 can be formed to be flexible. The actuator 200 operated to bend a center of the body 105 will be described below. Examples of such actuators 200 may include a shape-memory alloy 210 or a motor 220 (FIG. 5).

FIG. 3 illustrates a cross section of the mobile terminal according to one embodiment of the present invention. The mobile terminal 100 includes a body 105 having a predetermined portion formed of a flexible material, a display 151 provided in the body 105 to display a screen and a shape-memory alloy 210 provided in the body 105 as the actuator that transforms the shape of the body 105 by changing the shape thereof based on an electrical signal selectively provided thereto.

The display 151 is configured of a flexible display capable of dealing with the bending of the body 105. The flexible display can be bent or rolled up. The flexible display may have flexibility that enables folding or unfolding.

A flexible printed circuit board 185 formed of a flexible material may be provided in the body 105. Although not shown in the drawings, a conventional printed circuit board and a flexible printed circuit board 185 may be selectively used at the partially flexible body 105. In other words, the flexible printed circuit board 185 may be provided in the flexible portion of the body 105 and the printed circuit board may be provided in the other portion formed of a firm material.

The printed circuit board is a board where a copper wire is printed and various components may be mounted on the printed circuit board. Such various components include a semiconductor, a condenser, resistances and the like, and electric wiring can be designed efficiently on the printed circuit board. Accordingly, the printed circuit board can reduce the size of the electronic devices and enhance the performance of the electronic devices.

The conventional printed circuit board is formed of a firm board having a predetermined strength. However, the flexible printed circuit board 185 is a flexible board like plastic where electronic devices are attached to mount an electronic circuit thereon and it is fitted to a transformable structure.

In this exemplary embodiment, the entire portion of the body 105 is formed of the flexible material and the actuator 200 is formed from a shape memory alloy 210 of which an original shape is alternatively changed into a transformed shape based on temperature change. The shape memory alloy 210 is provided in the body 105 to enable transformation of the shape of the body 105. When it includes an electrical signal, the shape memory alloy 210 generates heat by using a resistance provided in metal to transform the shape.

The shape memory alloy 210 is one of various metal alloys having a property of returning to the original shape over a transformation temperature even when the shape thereof is transformed below a transformation temperature. Such transformation temperature is generally a unique uniform temperature of a specific material when a state of a material is transformed.

In other words, the shape memory alloy 210 is fabricated to have memory of the bent shape. It maintains a plane shape and the shape of the shape memory alloy 210 is transformed into the bent shape when the temperature of the shape memory alloy reaches a preset temperature or higher.

The shape memory alloy 210 is able to transform a thermal energy into a mechanical energy (displacement or force) and it is desirable to have a good shape memory effect, a dust elimination property, a super elastic effect and the like. Also, the shape memory alloy 21 has a good anti-corrosion property.

The shape memory effect means a property that makes the shape transformed at a low temperature below a critical value and return to an original shape when it is heated to have a high temperature. The shape memory effect is best achieved at Martensite of the shape memory alloy 210. When the shape memory alloy 210 is dropped to Martensite at a predetermined height, a dull sound such as rubber is generated, not a metallic sound. Such super elastic effect is a property configured to transform the shape at Austenite over a critical temperature point and to restitute the original shape when an external shock is removed.

The shape memory alloy 210 may be classified into Ni-base, Cu-base and Fe-base. There may be dozens types of alloy-bases. Such types of alloy-bases include Cu—Zn—Ni, cu-Al—Ni, Ag—Ni, Au—Cd and the like combined with Zn, Al, Au, Ag and the like. The best shape memory alloy is known as Ni—Ti alloy.

Alloy mixed with Nickel and Titanium by a ratio of 1:1 is called as Nitinol. A crystalline structure of such Nitinol is transformed when the temperature is changed. At a low temperature, an atomic structure of Nitinol will easily change and at a high temperature the atomic structure will be hard with little change.

In such the crystalline structure of Nitinol, hundreds of crystal units having specific shapes and angles are repeatedly formed. Most of metallic alloys have the internal structure not easily affected by temperature change. When heat is applied to them, atoms of an element are vibrated fast. Accordingly, the shape of the element is changed by an external force applied to the element but a molecule structure is not changed.

However, the shape memory alloy 210 has two stable crystalline structures of which a temperature changes. Temperature change may change one of the crystalline structures into the other. A critical temperature capable of causing such change may be variable based on an element and kind of a metallic alloy. Nitinol activates the shape memory effect at a large temperature range from −400° F. (−240° C.) to 212° F. (100° C.).

Atomic arrangement of Nitinol at a high temperature is a face-entered cube structure (atoms are arranged in a center of a cube having 8 corners and 6 sides). When cooling Nitinol, the face-centered cube structure of the atomic arrangement is changed into a body-centered cubic structure in that atoms arranged in sides are arranged in a center of the cube, with maintaining atoms arranged in 8 corners. The crystalline structure change between the body-centered and face-centered cubic crystalline structures may enable the shape memory effect.

To allow the memory alloy 210 to change the shape based on an electrical signal transmitted thereto, the shape memory alloy 210 is electrically connected to the controller 180 and the controller 180 selectively provides an electrical signal to the shape memory alloy 210. When the electrical signal is transmitted to the shape memory alloy 210, heat is generated by an electric resistance within the shape memory alloy 210 and that change an internal temperature of the shape memory alloy 210 only to change the shape of the shape memory alloy 210 eventually.

In other words, the shape memory alloy 210 transforms the electrical signal into a thermal energy, using the electric resistance. The thermal energy changes the crystalline structure of the shape memory alloy 210 to change the shape of the shape memory alloy 210.

The shape memory alloy 210 is extended in longitudinal direction of the body 105 with a predetermined width. The shape memory alloy 210 is formed of a plate shape longitudinally formed from an end to the other end of the body 105.

The reason why the shape memory alloy 210 is formed in the plate-shape having a predetermined width is that it is desirable that the shape memory alloy 210 have a predetermined surface area to cause the shape transformation of the shape memory alloy 210. The reason why the shape memory ally 210 is longitudinally extended is that the energy generated by the shape transformation of the shape memory alloy 210 has to be used in changing the shape, not absorbed by a tension within the body 105. When a predetermined force is applied to objects formed of the same material, shape transformation of a relatively longer object may be generated easily.

Also, when an internal temperature is over a transformation temperature in a level shape of the shape memory alloy 210, the shape memory alloy 210 may be transformed to be bent and the shape memory alloy 210 is configured to remember the bent rounded shape. The shape of the shape memory alloy 210 is level when it is mounted in the body 105. Accordingly, the shape memory alloy 210 generally maintains a level state. When the internal temperature is over the transformation temperature, the shape memory alloy 210 restitutes to an original bent shape.

Figure 4:
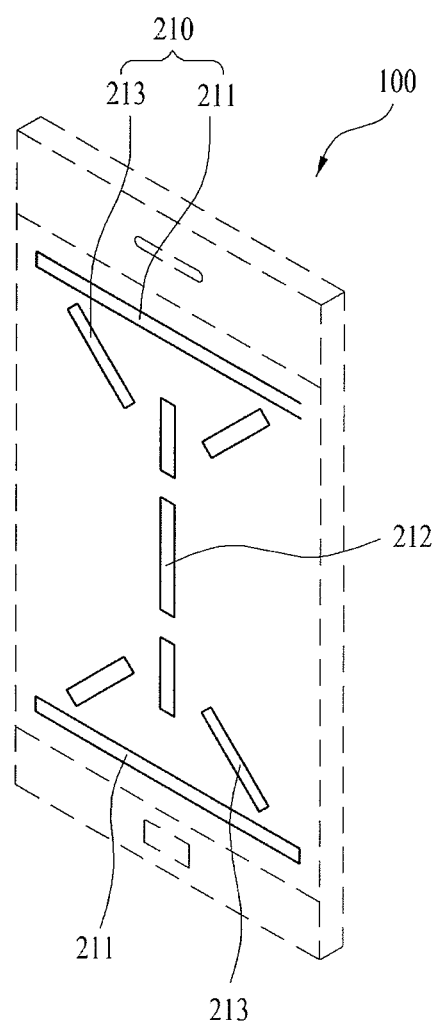

FIG. 4 is a diagram illustrating an example of various position of the shape memory alloy 210. The horizontally extended shape memory alloy 211 may be controlled to be bendable as shown in FIGS. 12, 13, 18 and 19. As shown in the drawings, the horizontal shape memory alloy 211 may cover an entire horizontal portion. Optionally, the horizontal shape memory alloy 211 may be segmented and arranged like a vertical shape memory alloy 212.

The vertical shape memory alloy 212 may be controlled to perform a bendable operation as shown in FIGS. 7, 9, 10, 11 and 15. The vertical shape memory alloy 210 is segmented into a plurality of units. Optionally, the vertical shape memory alloy 212 may be integrally formed as one body like the horizontal shape memory alloy 211. A diagonal shape memory alloy 213 may be configured to perform an operation shown in FIG. 14.

As an alternative to the shape memory alloy 210, a motor 220 and a frame 225 may be used as the actuator 200, as shown in FIG. 5. The entire portion of the body 105 may be formed of a flexible material or only a bent portion where the motor 220 is positioned may be formed of a flexible material.

The actuator 200 according to an embodiment of the present invention may be connected to a plurality of frames 225 to enable the motor 220 to change an angle between adjacent frames 225. The motor 220 may be driven by a signal transmitted from the controller 180, to change angles between the frames 225. As the angles between the frames 225 are changed, the shape of the body provided in the mobile terminal 100 is changed.

In the drawings, two motors 220 and three frames 225 are provided to be bent in a 'U' shape; however, the present invention is not limited thereto.

The motor 220 includes a motor body for generating a rotational force and a shaft for transmitting the rotational force to the outside of the motor. When different frames 225 are connected to the motor body and the shaft, respectively, an angle between two of the frames 225 may be changed by the rotation of the motor body and the shaft.

As shown in FIG. 5, a pair of motors 220 may be mounted to both sides of the mobile terminal 100 and the vibration generated from the motors 220 may be countervailed after that. When the controller 180 controls the motor body to rotate on the shaft based on the signal applied to the pair of the motors 220, the body 105 may be bent from a planar shape, as shown in FIG. 5(a) to a 'U' P shape, as shown in FIG. 5(b).

The actuator 200 mentioned above is changed when the controller 180 applies the signal. The controller 180 applies a signal to the actuator 200 to perform a corresponding operation when a set condition is satisfied.

The operation of the actuator 200 is performed to enhance user convenience. The operation of the actuator 200 may be performed to change the shape of the mobile terminal 100 to prevent the user from dropping the mobile terminal 100 or to minimize breakage of the mobile terminal 100 even when the user drops the mobile terminal 100, or the shape of the body 105 provided in the mobile terminal 100 may be changed to notify the user of receiving a message.

Also, the shape of the mobile terminal 100, when placed on the floor, can be changed into a shape easily held by the user. When the battery is almost dead, the shape of the mobile terminal may be changed to reduce consumption of the battery or to charge the battery.

If the shape of the mobile terminal in a planar configuration is large, the shape of the mobile terminal may be folded when the user carries the mobile terminal to make it easier to carry. The body 105 can be automatically folded or unfolded without direct input from the user.

Without the user's inputting a command to the controller 180 directly to perform the shape transformation nor the user's folding or unfolding the body 105 of the mobile terminal 100, the controller 180 transmits a signal to the actuator and the actuator 200 changes the shape of the body 105 based on the signal.

Referring to FIGS. 6 to 9 showing a drop prevention operation of the mobile terminal 100 according to an embodiment of the present invention, a control method for the controller 180 of the mobile terminal 100 to control the actuator 200 will be described as follows.

Figure 6:
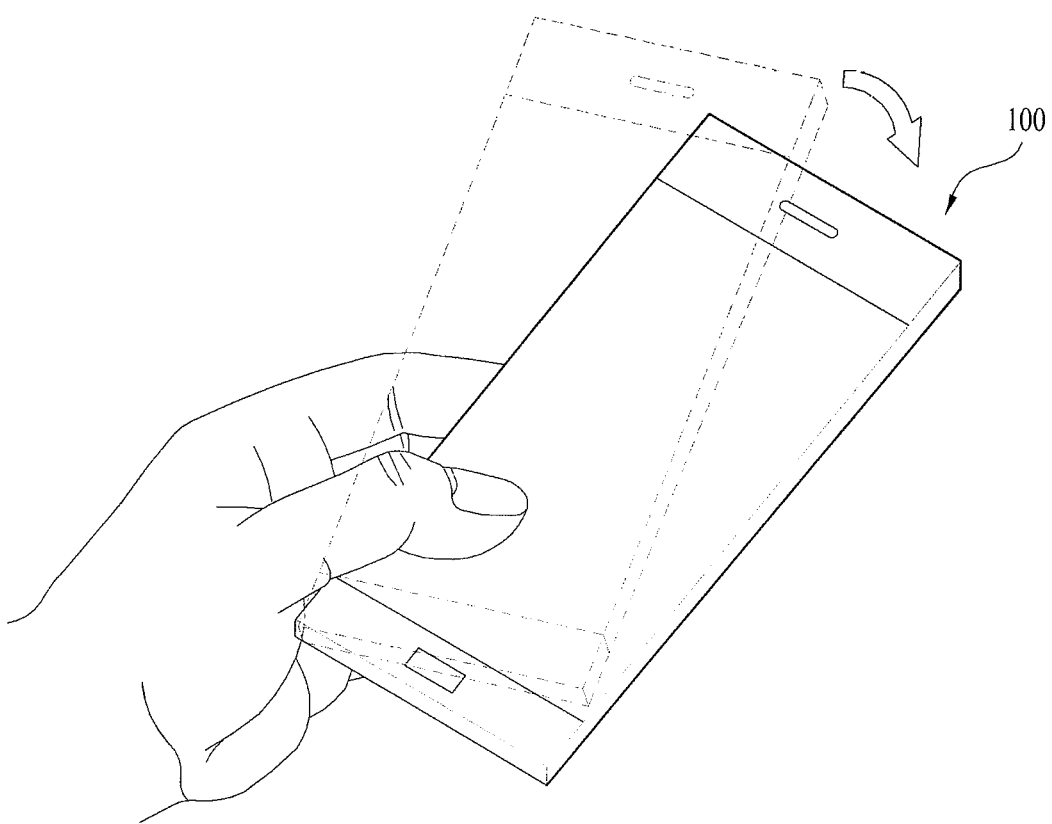
FIGS. 6 to 9 are diagrams to explain a dropping prevention operation of the mobile terminal according to an embodiment of the present invention.

As shown in FIG. 6, the mobile terminal 100 held by the user happens to be inclined and if the force of the hand holding the mobile terminal decreases, the user might drop the mobile terminal 100 to the ground. When the force of the user's hand holding the mobile terminal decreases, the balancing weight is inclined and the body 105 of the mobile terminal is inclined as shown in FIG. 6.

At this time, the controller 180 may transform the shape of the mobile terminal 100 to move the balancing weight of the body 105 to an opposite portion of the inclined portion. As shown in FIG. 6, when the balancing weight of the mobile terminal 100 is moved backwardly, the controller 180 may control an upper portion of the mobile terminal 100 to bed forwardly, as shown in FIG. 7.

Because the mobile terminal is bent in the reverse direction of the inclined portion, the inclination speed may be reduced. When the user holds the mobile terminal strongly, the mobile terminal may be prevented from being dropped to the ground.

Figure 7:
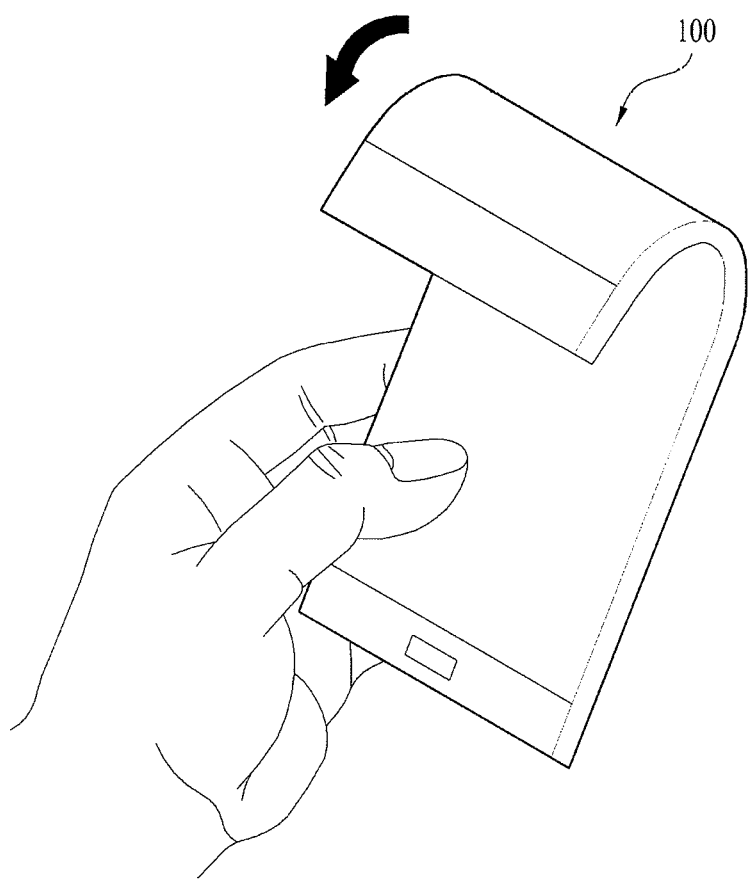

FIGS. 6 and 7 show the operation of the actuator 200 when the mobile terminal 100 is inclined backwardly. When the mobile terminal is inclined to the right or left, the actuator 200 is controlled to perform the operation to bend a right or left end of the mobile terminal leftward or rightward, respectively, and the mobile terminal may be prevented from falling to the floor.

The inclination of the body 105 mentioned above may be detected by an acceleration sensor 142 detecting movement of the body 105 by detecting the acceleration applied to the body 105 and a pressure sensor 143 measuring the pressure applied by the user when holding the mobile terminal 100.

In other words, the pressure sensor 142 detects that the user holding pressure is decreasing. When the body 105 is abnormally inclined or acceleration is applied, it is determined that the mobile terminal is sliding from the user's hand and the shape of the mobile terminal can be changed automatically.

When only the pressure sensor 143 is provided, the shape of the mobile terminal 100 might be changed only by the pressure sensor 143 whenever the user places the mobile terminal after holding it. When only the acceleration sensor 142 is provided, the shape of the mobile terminal might be changed whenever the user holding the mobile terminal moves. Accordingly, two states are sensed and when the two conditions are satisfied, the controller 180 controls the actuator 200 to bend the mobile terminal in the reverse direction of the inclined direction.

Figure 8:
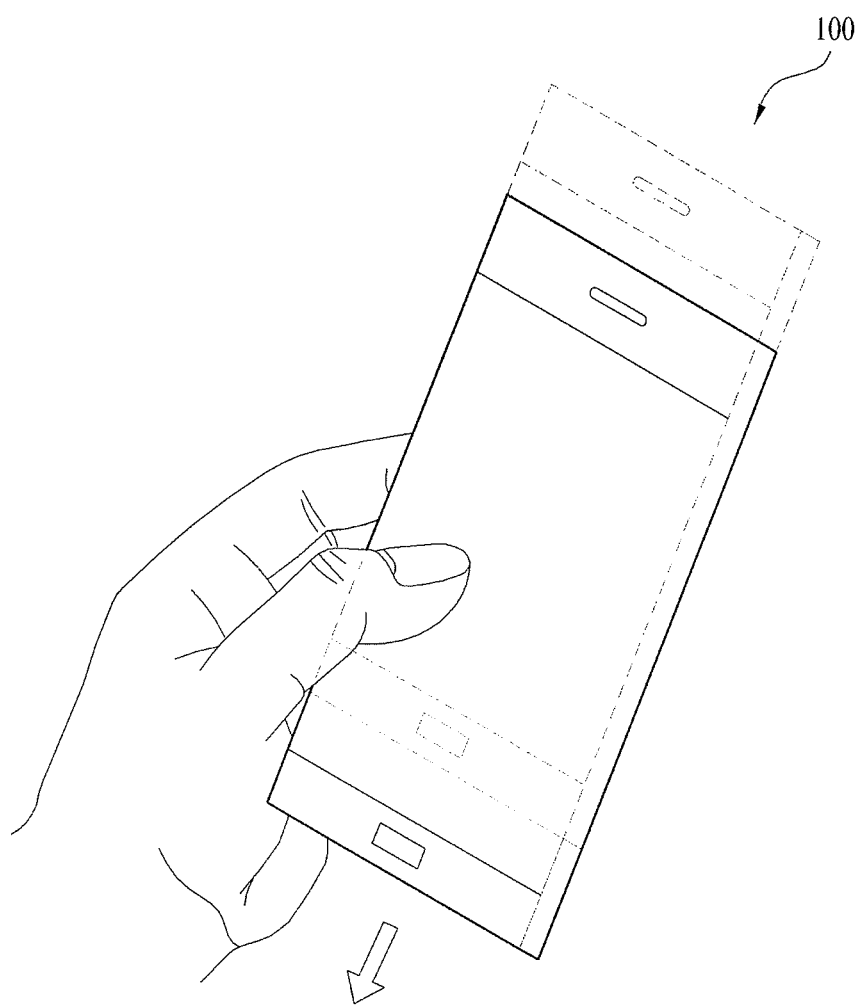
Figure 9:
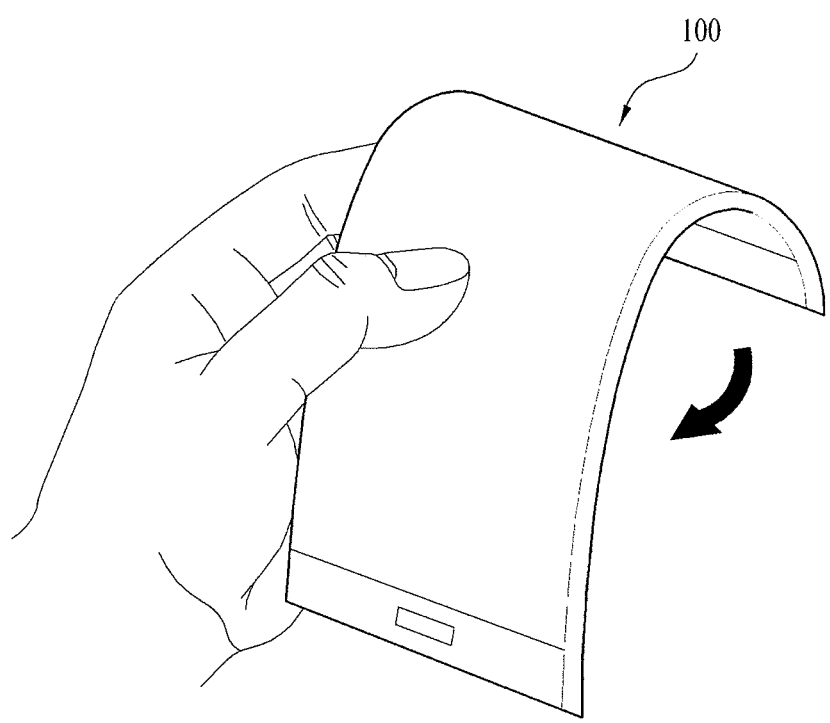

Hence, as shown in FIG. 8, the body 105 may escape between the user's fingers to fall to the ground without being inclined in one direction. In this instance, the controller 180 controls the actuator 200 to enable the body 105 of the mobile terminal 100 to be wound around the user's hand. As shown in FIG. 9, the mobile terminal 100 falling down to the ground is stopped from moving downwardly by the user's hand and the user cannot miss the mobile terminal 100.

The direction of wound around the user' hand is determined by the actuator 200 controlled to bend an upper portion of the held portion, after the pressure of the portion held by the user is detected to determine that four fingers are positioned in a large area of the held portion.

Figure 10:
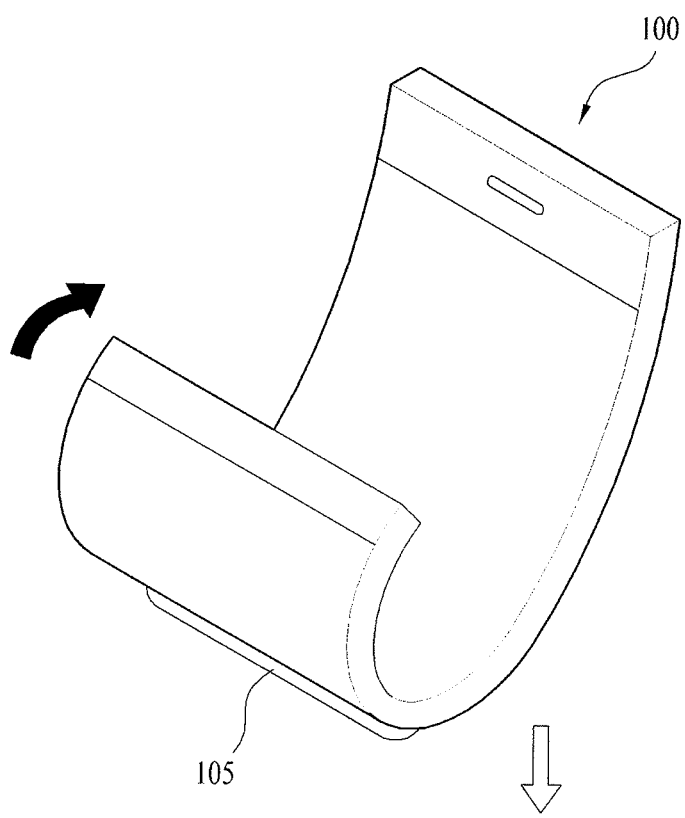
FIGS. 10 and 11 are diagrams to explain a shock prevention operation of the mobile terminal according to an embodiment of the present invention.
Figure 11:
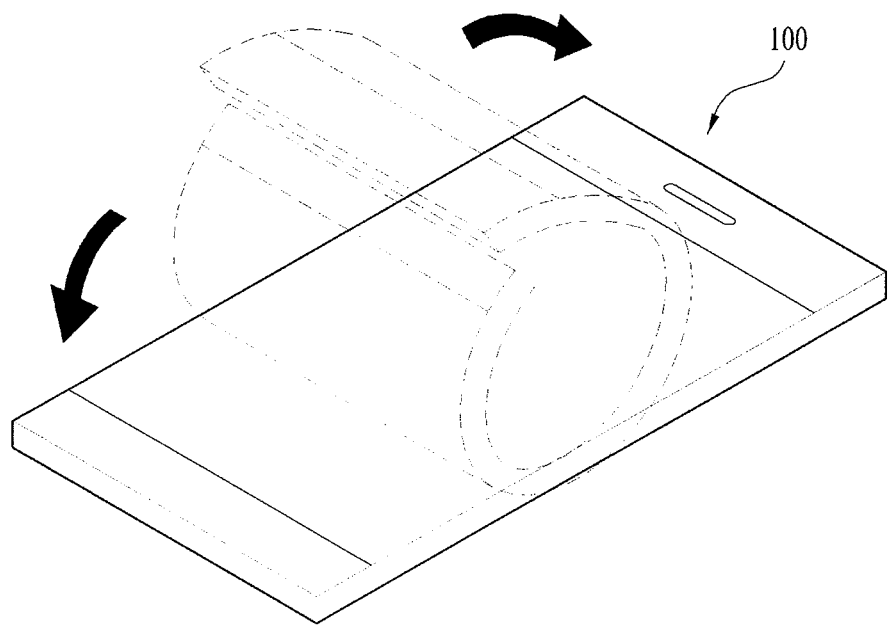

The user might still drop the mobile terminal 100 even with such ability to change shape, therefore it is desirable to prevent damage to the mobile terminal 100. FIGS. 10 and 11 are diagrams to explain a shock preventing operation of the mobile terminal 100 according to an embodiment of the present invention.

When the body 105 is moved until the acceleration detected by the acceleration sensor 142 is over a critical value, with no user holding pressure detected by the pressure sensor 143, it may be determined that the mobile terminal 100 is falling.

When it is determined that the mobile terminal is dropped to the ground after the conditions sensed by the acceleration sensor 142 and the pressure sensor 143 are satisfied, the controller 180 controls the body 105 of the mobile terminal 100 to be changed, as shown in FIG. 10, to make the area that will contact the ground larger. If the area of the mobile terminal that will first contact the ground is reduced, the shock applied to the mobile terminal would grow larger. For example if a corner of the mobile terminal reaches the ground first, the shock would be large. Therefore, the controller 180 causes the shape of the mobile terminal to be changed to provide a greater contact area. When the shape of the body 105 is curved, the body 105 is rolled before reaching the ground and the shock may be weakened. Preferably, a shock absorber such as silicon and robber is provided in a surface contacting with the ground and a shock can be absorbed to prevent the damage.

Moreover, in a predetermined time after being dropped the ground, the mobile terminal may be controlled to be unfolded, as shown in FIG. 11. When the actuator 200 is formed of a shape memory alloy, heat has to be applied to the shape to maintain the transformed shape constantly. Accordingly, it is preferred that the transformed shape is restituted to an original shape by blocking the signal as shown in FIG. 11, even when the transformed shape does not have to be maintained.

FIGS. 12 to 19 are diagrams to explain the operation of the mobile terminal 100 for notifying the user of that a message is being received according to another embodiment of the present invention. Examples of the message receiving may include text message receiving, missed call displaying, e-mail receiving, insufficient battery notifying and newly updated contents notifying.

When a notifying message is generated and received, the conventional mobile terminal 100 makes a sound, vibrates and/or displays a message receiving notification on a screen. However, the mobile terminal 100 according to an embodiment of the present invention transforms the shape of the body 105 to indicate message receiving function to the user.

Figure 12:
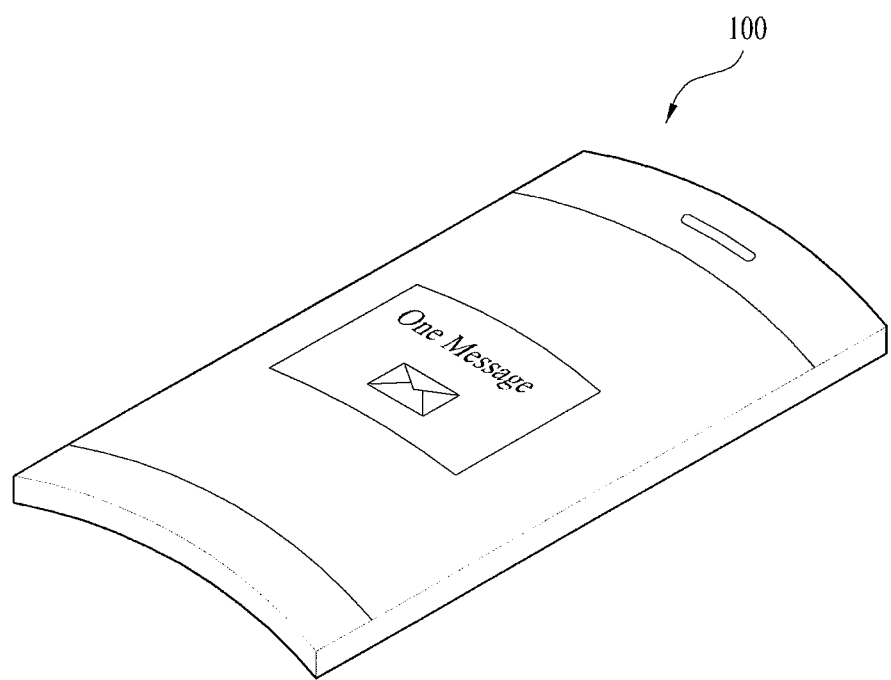
FIGS. 12 to 19 are diagrams to explain a message notifying operation of the mobile terminal according to an embodiment of the present invention.

When a text message is received, as shown in FIG. 12, the controller 180 controls the actuator 200 to bend the body 105. When the number of the received text messages is large, as shown in FIG. 13, the shape of the body 105 may be transformed more to indicate to the user that a large number of messages have been received.

Figure 13:
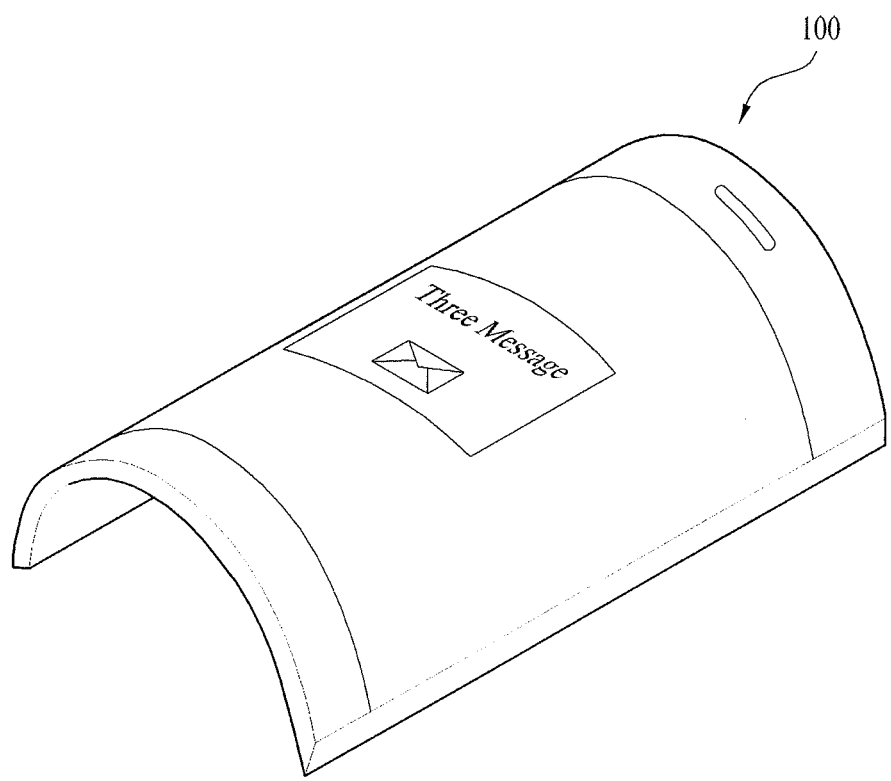

The transformation of the shape for a specific message receiving function is not limited to what is shown in FIGS. 12 and 13 and the shape of the body 105 may be bent in various directions such as the reverse direction or a vertical direction.

Figure 14:
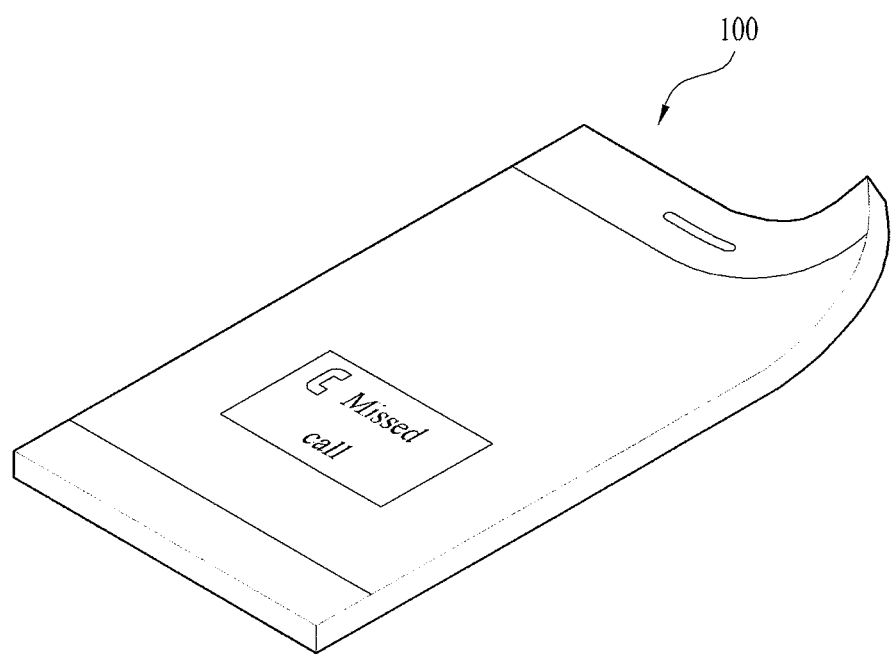

When different types of received messages are generated, the shape of the mobile terminal 100 may be transformed differently based on the types of the message. For example, in case of a missed call, as shown in FIG. 14, the actuator is controlled to bend a predetermined corner and it can be recognized that the message is different from the text message shown in FIG. 12.

Figure 15:
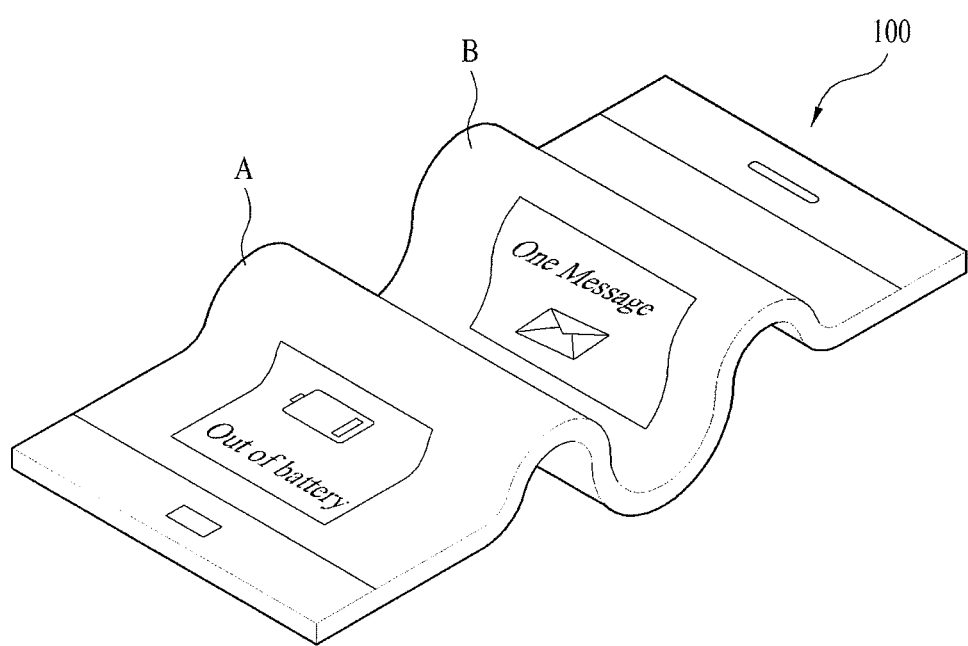

When there are multiple types of received messages, the corresponding shape of the mobile terminal for each type can be preset. Seeing the transformed shape, the user may expect various types of received messages. For example, when shapes of two portions in the body are transformed, as shown in FIG. 15, it can be expected that two types of received messages are generated. Optionally, icons for checking received messages may be arranged in the transformed portions, respectively. The user touches one of the icons and identifies the contents of the message corresponding to the touched icon directly.

Figure 16:
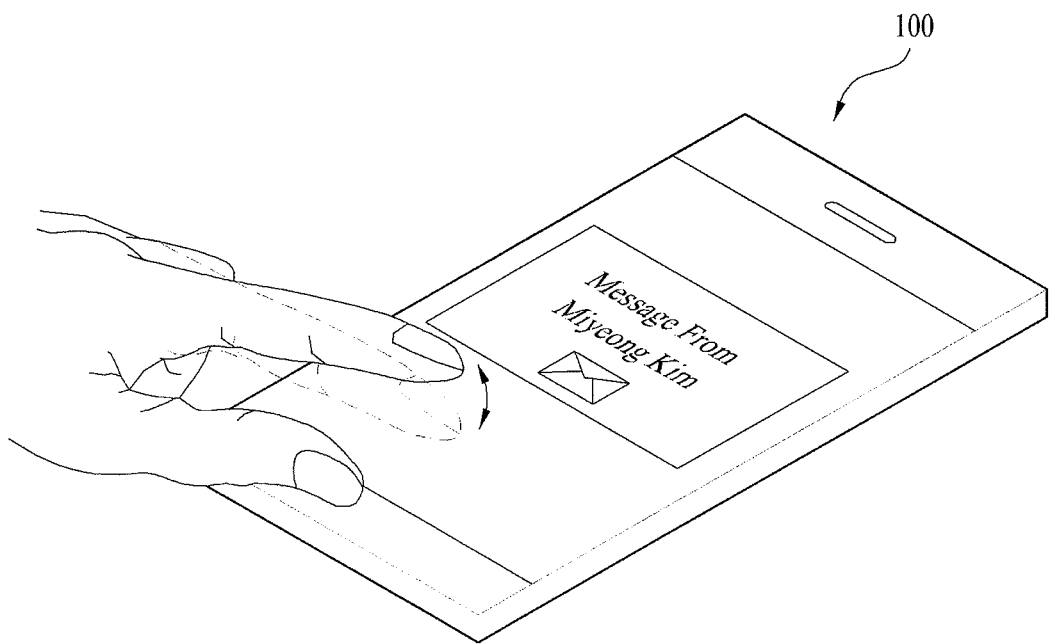
Figure 17:
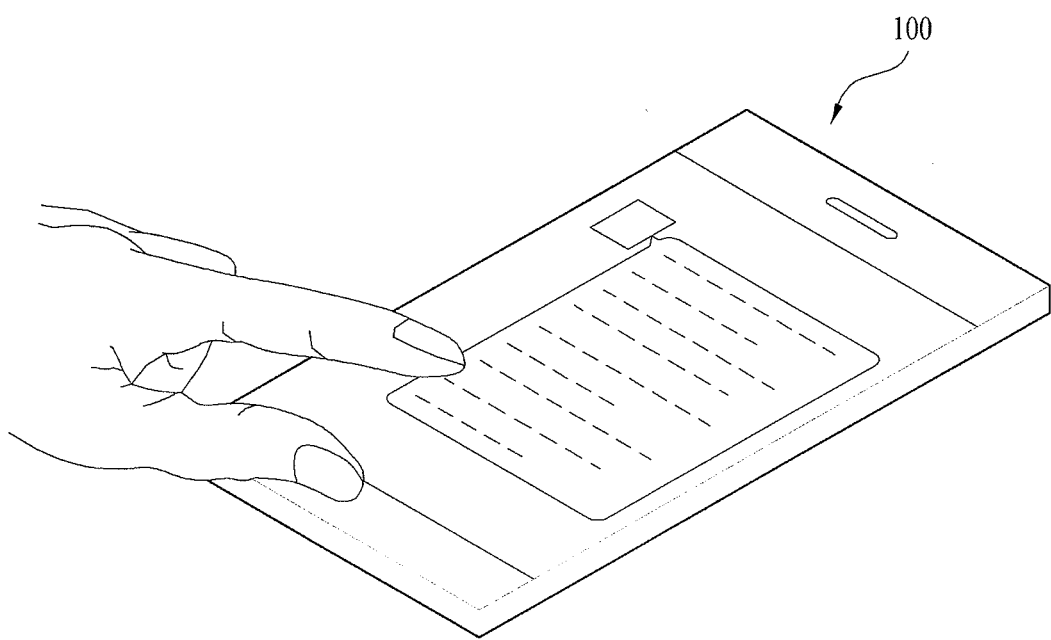

As shown in FIG. 16, when the user makes a short touch to check the messages, the shape of the body 105 is returned to the original shape. At this time, all of the message can be displayed or only brief messages can be transmitted. Optionally, when the touch duration time is more than a predetermined time period (for example, more than 3 seconds), specific contents of the messages can be checked.

When the proximity sensor 141 senses the user's hand approaching to the display 151, the transformed shape is returned to the original shape to unfold the display 151 level or the shape is transformed to a predetermined shape easily held by the user.

Figure 18:
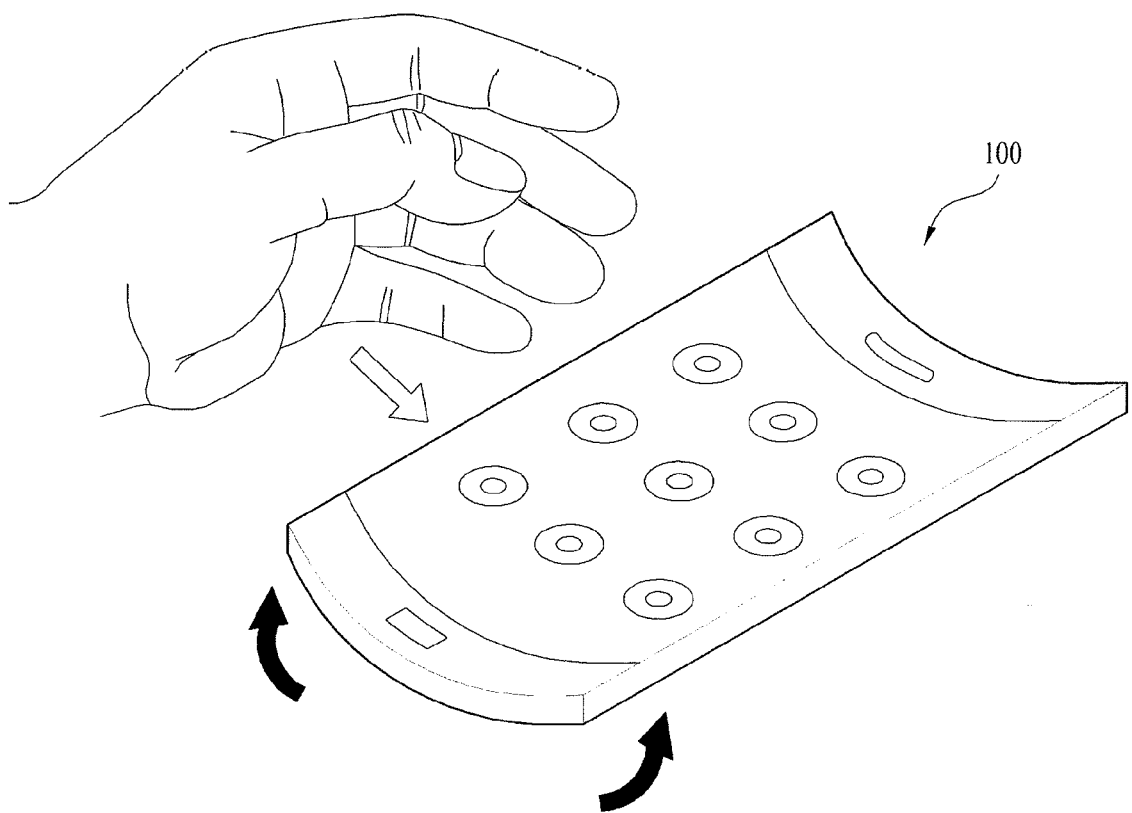
Figure 19:
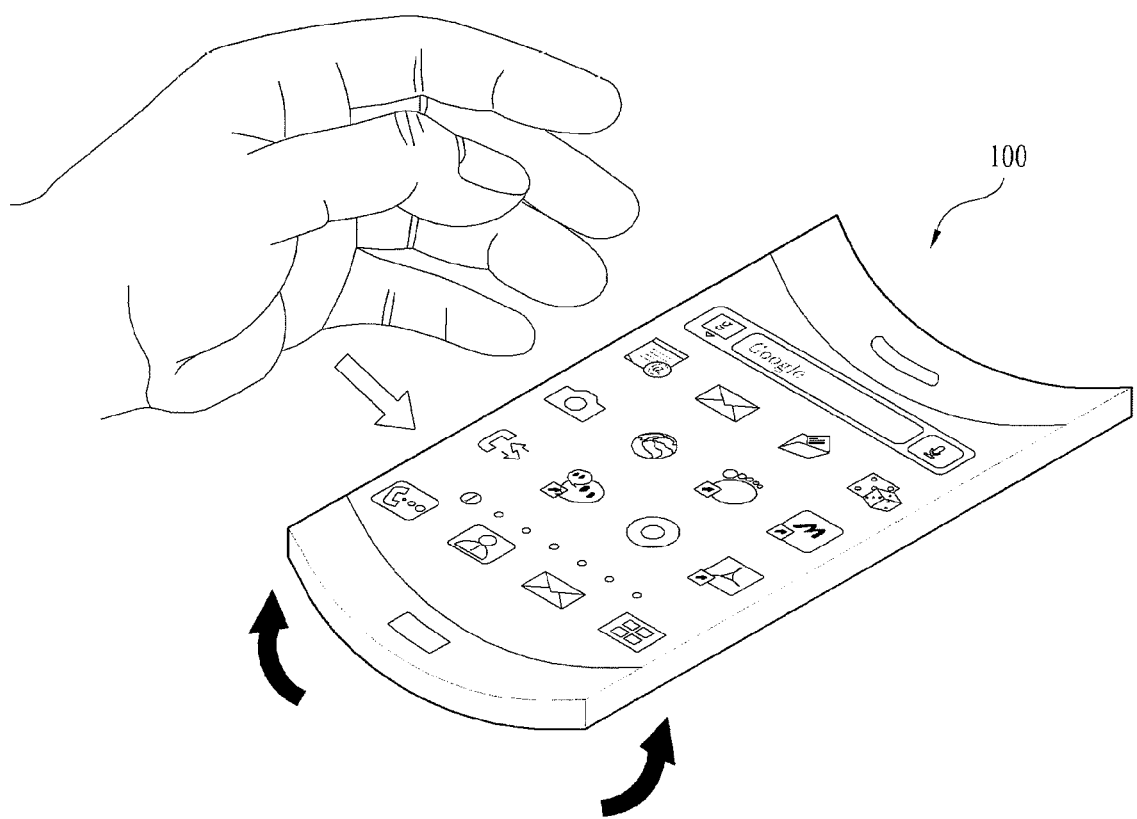

FIGS. 18 and 19 are diagrams illustrating the control of the actuator 200 to transform the shape of the mobile terminal into a shape easily held by the user. When the user approaches the body 105 or when a predetermined number of user contact points, or more, are sensed for a predetermined time, or more, at a preset pressure, or more, the user is expected to hold the mobile terminal and the shape of the mobile terminal is transformed.

In other words, when the user approaches the body 105, the proximity sensor 141 may sense the user approaching. When the condition expecting that the user will hold and use the mobile terminal is satisfied such as lock releasing is satisfied, the shape of the body 105 is transformed into a shape easily held by the user.

As the mobile terminal 100 is formed of a thin, flexible material, it is more difficult to hold than the conventional mobile terminal. As shown in FIG. 18, the shape of the mobile terminal 100 may be transformed to bend an end of the mobile terminal 100 toward the reverse direction of the surface where an end of the mobile terminal 100 is placed. A space is formed between the ground and the end of the mobile terminal to enable the mobile terminal to be held by the user more easily.

The present invention is not limited to the transformed shapes mentioned above.

When the user approaches the mobile terminal 100, the shape of the body is transformed into the shape held by the user easily. At the same time, when the mobile terminal 100 is in a locked state, the display 151 displays an icon for lock releasing. When the mobile terminal 100 is in an unlocked state, the display 151 is activated to display a screen before switched off or an initial screen on the display 151.

Figure 20:
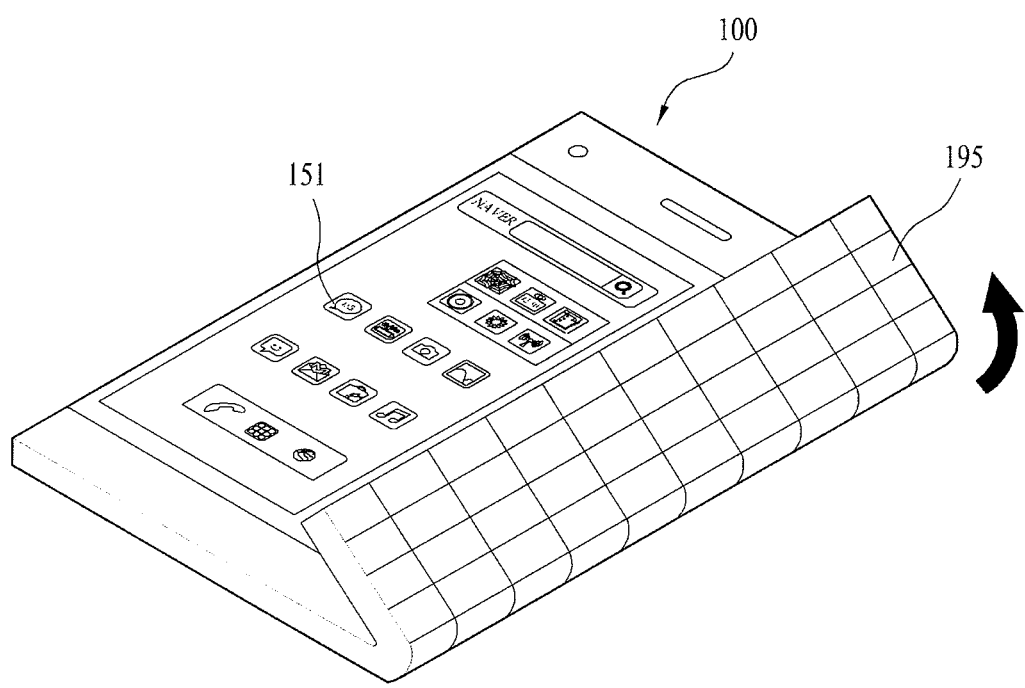
FIGS. 20 to 22 are diagrams to explain a battery supplementing operation of the mobile terminal according to an embodiment of the present invention.
Figure 21:
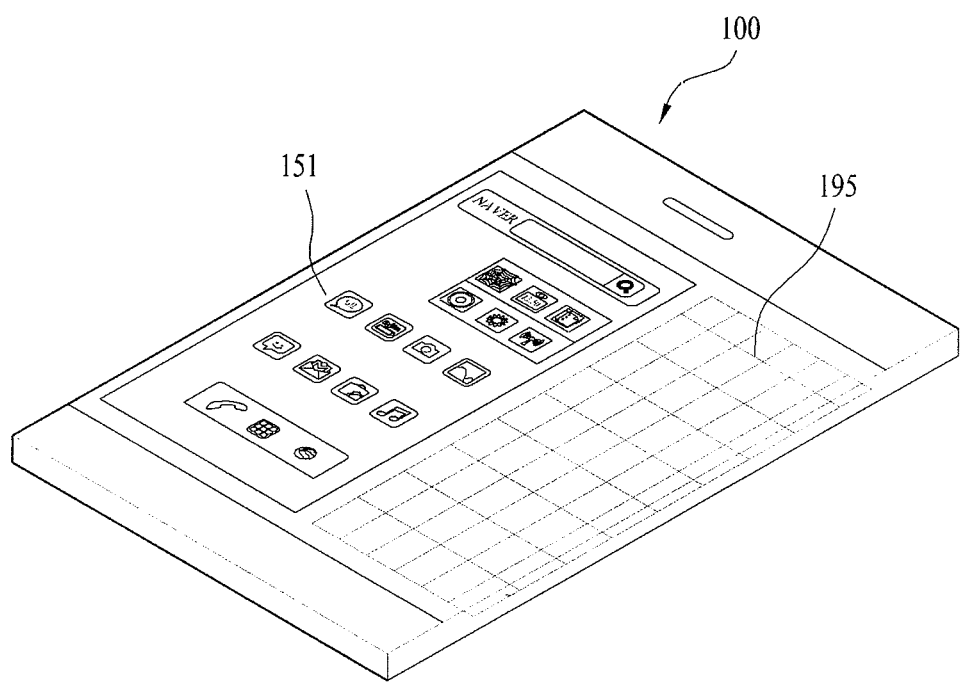
Figure 22:
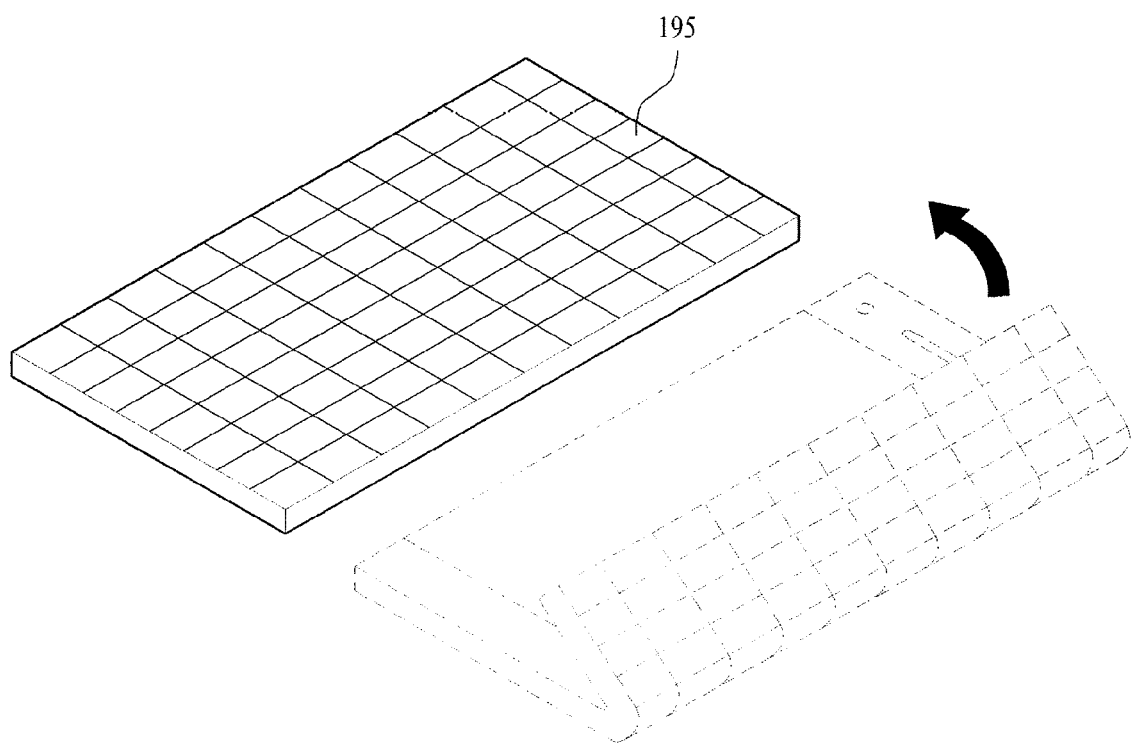

FIGS. 20 to 22 are diagrams to explain a power supplementary operation of the present invention. When a solar battery 195 is provided on a back side of the mobile terminal 100, a solar battery can be charged without using wires. The display 151 is arranged on the front side and it is difficult to arrange the solar battery 195 in the back side. However, an area of the back side is not used and the solar battery 195 may be provided in the back side, as shown in FIGS. 20 to 22.

The solar battery 195 absorbs solar energy and changes the absorbed solar energy into electric energy. A conventional solar battery 195 is formed on a firm silicon substrate. However, recently, a thin film solar battery has developed and the thin film solar battery is deposited on the backside of the mobile terminal.

Examples of such a thin film solar battery include a-Si solar battery, CIGS/CIS solar battery, CdTe solar battery and dye-sensitized solar battery. Compared with the conventional solar battery, the thin film solar battery has a simpler manufacture process and a low manufacture cost advantageously. In addition, the shape of the thin film solar battery may be transformed and such the thin film solar battery may be mounted in the flexible body 105.

When the battery of the mobile terminal 100 is running out, the actuator 200 may be controlled to partially fold the body 105 to position where the solar battery 195 is moved from the back side to the front side. At this time, when the display 151 is reduced to output, the battery can charge while the user is using the mobile terminal 100. Moreover, when a transparency of the screen on the reduced display 151 is heightened to control lights to reach the solar battery mounted in the back side, battery supplement efficiency may be enhanced.

Also, the size of the display 151 may be reduced and the transparency of the inactivated portion is increased, such that lights may be controlled to reach the solar battery 195 as shown in FIG. 21, without being folded.

Preferably, the body 105 may be folded to turn over completely, as shown in FIG. 22. When the body 105 is folded to turn over, an entire portion of the solar battery 95 may be exposed to the front side to generate electricity. Accordingly, energy efficiency may be improved remarkably.

FIGS. 23 to 26 are diagrams explaining a locking operation of the mobile terminal according to an embodiment of the present invention, by transformation of the shape of the body 105 between a locked or unlocked state.

As the size of the mobile terminal 100 is getting larger and thinner, the mobile terminal 100 may be folded to be smaller for portability. If the mobile terminal 100 is in a locked state when folded, the locked state can be released and the mobile terminal 100 may be automatically unfolded to be in a usable state. When locking of the mobile terminal is set, the mobile terminal 100 may be folded to an easy-to-carry size.

Figure 23:
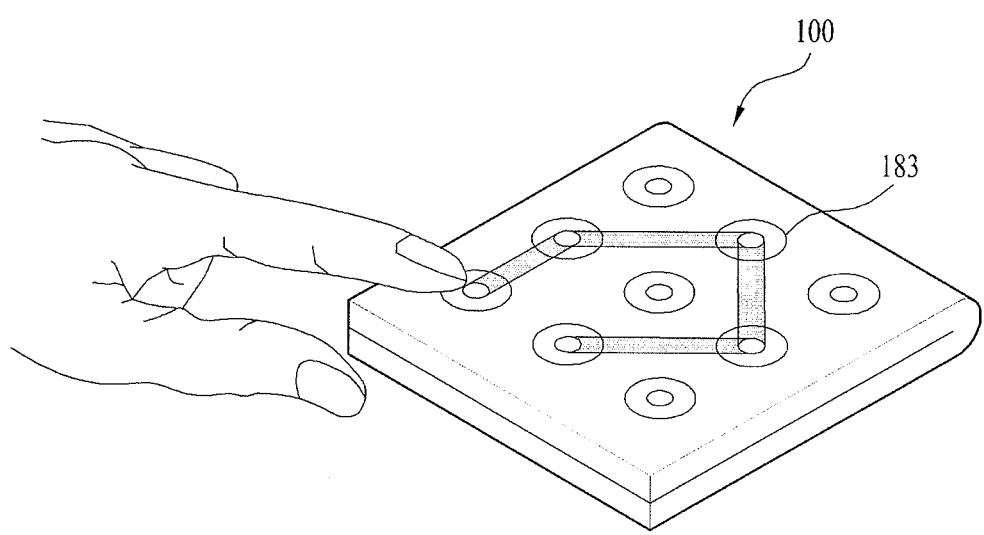
FIGS. 23 to 26 are diagram to explain a locking operation of the mobile terminal according to an embodiment of the present invention.
Figure 24:
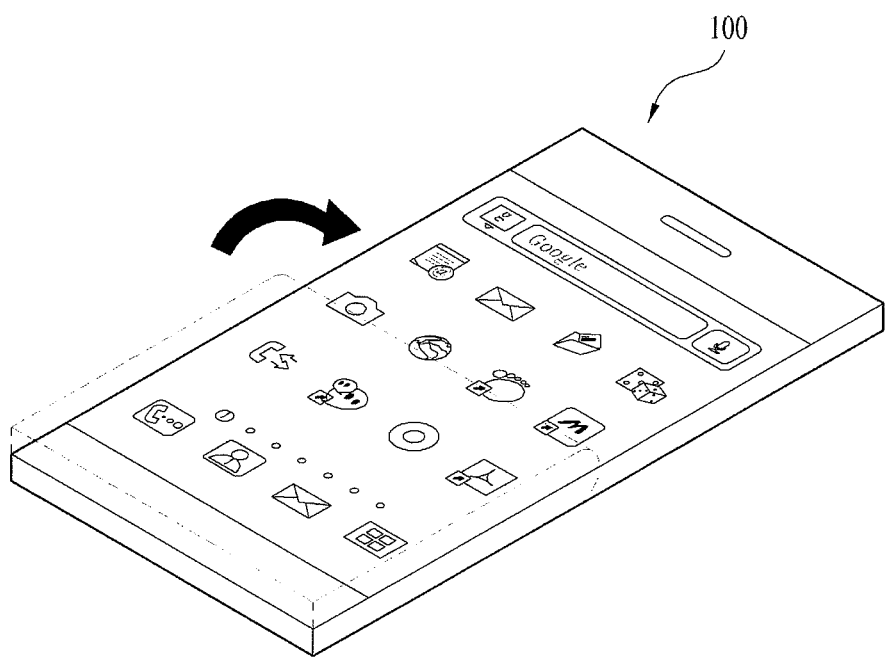
Figure 25:
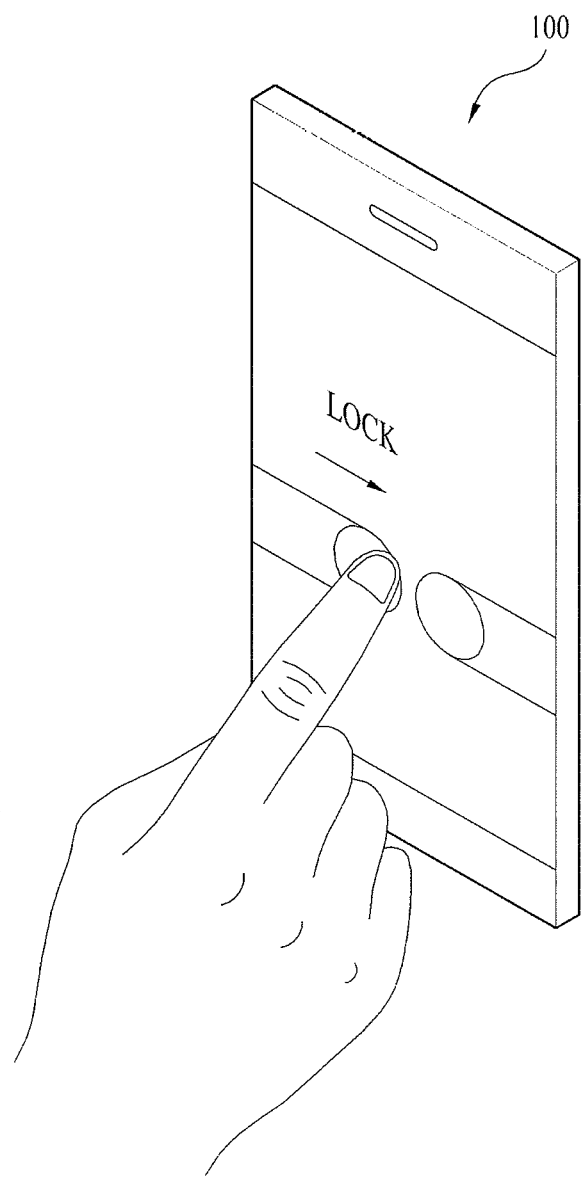
Figure 26:
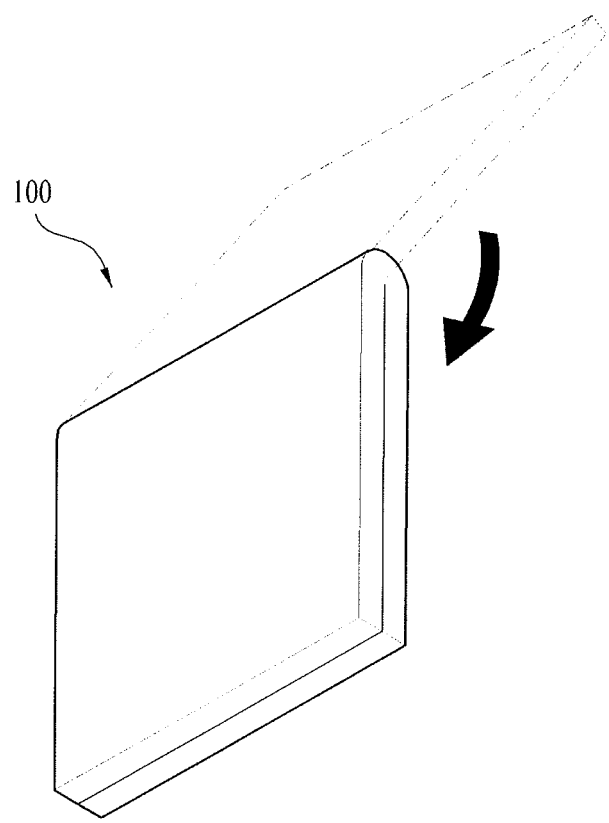

When the user releases the lock of the mobile terminal in a state where the body 105 is folded, as shown in FIG. 23, the user may be expected to use the mobile terminal 100 and the controller 180 controls the actuator 200 to unfold the folded body as shown in FIG. 24. In contrast, when the user sets the lock of the mobile terminal 100 as shown in FIG. 25, the user is expected not to use the mobile terminal 100 and the mobile terminal 100 is likely to be put into a bag or pocket. At this time, the mobile terminal 100 may be folded to an easy-to-carry size, as shown in FIG. 26.

As mentioned above, the body 105 provided in the mobile terminal 100 according to an embodiment of the present invention includes the actuator 200 to transform the shape of the body. Accordingly, user convenience may be enhanced.

Specifically, damage to the mobile terminal dropped to the ground by the user may be prevented. The user may be notified of a received message by a new method, not by the conventional displaying methods such as sound, vibration and screen display.

Moreover, when the user approaches the mobile terminal, the shape of the slim flexible body 105 is transformed into the shape easily held by the user. Accordingly, user convenience may be enhanced.

When the battery is running out, the shape of the mobile terminal 100 may be transformed into the shape enabling the solar battery to charge efficiently. Accordingly, the usage time of the mobile terminal may be increased without auxiliary charging.

Various variations and modifications are possible in the component parts and/or arrangements of the subject combination arrangement within the scope of the disclosure, the drawings and the appended claims.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:
1. A mobile terminal comprising:
a body having at least one predetermined flexible portion;
a display provided in the body and configured to display image information;
an actuator provided in the body and configured to transform a shape of the body from an original shape to a transformed shape; and a controller configured to:
  control the actuator to transform the shape of the body when a notifying message to be transmitted to at least one other terminal is generated in a standby state of the mobile terminal, and
  control the actuator to increase an amount of bending based on a number of the notifying messages.

2. The mobile terminal according to claim 1, wherein the notifying message comprises at least one of a received text message notification, a missed call notification, a received e-mail notification, a low battery notification and a newly updated contents notification, and
  wherein the controller is further configured to control the actuator to provide different transformed shapes of the body based on the types of the notifying messages.

3. The mobile terminal according to claim 1, wherein the configured is further configured to:
  sense a touch applied to the body,
  control the display to display brief contents of the notifying message when sensing that the applied touch is for a shorter time than a predetermined time, and
  control the display to display detailed contents of the notifying message when the applied touch is for a longer time than the predetermined time.

4. The mobile terminal according to claim 1, further comprising:
  a sensor configured to sense an approach of the user,
  wherein the preset condition is further satisfied when the sensor senses the approach of the user, and
  wherein the controller is further configured to control the actuator to bend at least one part of a circumference of the body so as not to be coplanar with the rest of the body.

5. The mobile terminal according to claim 4, wherein, when the mobile terminal is in a locked state, the controller is further configured to control the display to display an icon for unlocking the mobile terminal, and
  wherein, when the mobile terminal is in an unlocked state, the controller is further configured to activate the display.

6. The mobile terminal according to claim 1, further comprising:
  a solar battery provided at a surface opposite a surface where the display is located,
  wherein the preset condition is further satisfied when a battery amount is reduced below a reference value, and
  wherein the controller is further configured to control the actuator to fold the body to a position where the solar battery is above the surface having the display or to cause the body to turn over to expose the solar battery.

7. The mobile terminal according to claim 6, wherein, when the display is displaying a screen, the controller is further configured to:
  control the display to reduce a size of the screen output, and
  control the actuator to transform the shape of the body to position the solar battery above the portion of the display where the screen is not output.

8. The mobile terminal according to claim 1, further comprising:
  a solar battery provided at a surface opposite the surface where the display is located,
  wherein, when the display is displaying a screen, the controller is further configured to:
  control the display to reduce a size of the screen output, and
  increase a transparency of the display at a portion of the display where the reduced screen is not output to allow external light to be incident on the solar battery.

9. The mobile terminal according to claim 1, wherein the preset condition is satisfied when the mobile terminal is set in a locked state,
  wherein the controller is configured to:
  control the actuator to fold the body such that a cross-sectional area of the transformed shape is smaller than a cross-sectional area of the original shape, and
  control the actuator to return the body to the original shape when the user releases the locked state.

10. The mobile terminal according to claim 1, wherein the actuator is formed of a shape memory alloy that changes between an original shape and a transformed shape based on a temperature change, and
  wherein the controller is further configured to transform the shape of the shape memory alloy by causing the shape memory alloy to be heated.

11. The mobile terminal according to claim 10, wherein the controller is further configured to transmit an electrical signal to the shape memory alloy to cause the shape memory alloy to be heated.

12. The mobile terminal according to claim 1, wherein the actuator includes:
  a motor having a motor body and a rotatable shaft, the motor configured to rotate the shaft based on a signal from the controller; and
  a plurality of frames, at least one of the frames being connected to the shaft and at least one of the frames being connected to the motor body, and
  wherein an angle between the at least one frame connected to the shaft and the at least one frame connected to the motor body is adjustable by rotation of the shaft.

13. A mobile terminal comprising:
  a body having at least one predetermined flexible portion;
  a display provided in the body and configured to display image information;
  an actuator provided in the body and configured to transform a shape of the body from an original shape to a transformed shape;
  a controller configured to control the actuator to transform the shape of the body when a preset condition is satisfied;
  an acceleration sensor configured to sense a movement of the body by detecting an acceleration applied to the body; and
  a pressure sensor configured to measure a pressure applied to a portion of the body when held by a user,
  wherein the preset condition is satisfied when the pressure sensor senses that the pressure applied to the portion of the body held by the user is decreased and the acceleration sensor senses the movement of the body.

14. The mobile terminal according to claim 13, wherein the controller is further configured to control the actuator to transform the shape of the body in an opposite direction of the sensed movement of the body.

15. The mobile terminal according to claim 13, wherein the controller is further configured to control the actuator to bend the body in a direction to wrap around the user's hand.

16. A mobile terminal comprising:
  a body having at least one predetermined flexible portion;
  a display provided in the body and configured to display image information;
  an actuator provided in the body and configured to transform a shape of the body from an original shape to a transformed shape;
  a controller configured to control the actuator to transform the shape of the body when a preset condition is satisfied;

an acceleration sensor configured to sense a movement of the body by detecting an acceleration applied to the body; and a pressure sensor configured to measure a pressure applied to a portion of the body when held by a user, wherein the preset condition is satisfied when the applied pressure is no longer detected by the pressure sensor and the sensed movement of the body by the acceleration sensor is at at least a critical value, and wherein the controller is further configured to control the actuator to bend the body to prevent collision of corners of the body with another object.

17. The mobile terminal according to claim 16, further comprising:

a shock absorber provided at the bent portion of the body to absorb a shock.

18. The mobile terminal according to claim 16, wherein the controller is further configured to control the actuator to return the body to the original shape when a predetermined time period is passed.

19. A mobile terminal comprising:

a body having at least one predetermined flexible portion;

a display provided in the body and configured to display image information;

an actuator provided in the body and configured to transform a shape of the body from an original shape to a transformed shape; and a controller configured to:

control the actuator to transform the shape of the body when a notifying message to be transmitted to at least one other terminal is generated in a standby state of the mobile terminal, sense when a user approaches the body, and when sensing the user approaches the body after the generated notifying message, control the actuator to change the body into a predetermined curl shape for grabbing the mobile terminal.

* * * * *